(12) United States Patent
Morgan et al.

(10) Patent No.: US 10,762,147 B2
(45) Date of Patent: *Sep. 1, 2020

(54) INVENTORY DATA ACCESS LAYER

(71) Applicant: D&B BUSINESS INFORMATION SOLUTIONS, U.C., Dublin (IE)

(72) Inventors: William Morgan, Easton, PA (US);
Robert Tam, Staten Island, NY (US);
Nina Gerasimova, Randolph, NJ (US);
Keith Gastauer, New Hope, PA (US);
Stacey Rasgado, New York, NY (US);
Ken Einstein, San Mateo, CA (US);
Chip Swanson, Sebastopol, CA (US);
Neil Lamka, Port Ludlow, WA (US);
Dave Horowitz, Short Hills, NJ (US);
Jim Longo, Mill Valley, CA (US);
Emmet Townsend, Longford (IE);
Julian Prower, Oxon (GB)

(73) Assignee: D&B BUSINESS INFORMATION SOLUTIONS, U.C., Dublin (IE)

( * ) Notice: Subject to any disclaimer, the term of this patent is extended or adjusted under 35 U.S.C. 154(b) by 655 days.

This patent is subject to a terminal disclaimer.

(21) Appl. No.: 15/361,769

(22) Filed: Nov. 28, 2016

(65) Prior Publication Data
US 2017/0076004 A1 Mar. 16, 2017

Related U.S. Application Data

(63) Continuation of application No. 13/360,254, filed on Jan. 27, 2012, now Pat. No. 9,507,864.
(Continued)

(51) Int. Cl.
G06F 16/9535 (2019.01)
G06F 16/25 (2019.01)
(Continued)

(52) U.S. Cl.
CPC ........... *G06F 16/9535* (2019.01); *G06F 9/54* (2013.01); *G06F 16/25* (2019.01); *H04L 67/1097* (2013.01); *H04L 69/18* (2013.01)

(58) Field of Classification Search
CPC ... H04Q 3/005; H04Q 3/0029; H04M 3/4228; H04M 3/42297; G06F 12/0292;
(Continued)

(56) References Cited

U.S. PATENT DOCUMENTS 5,737,422 A 4/1998 Billings
5,930,799 A 7/1999 Tamano et al.
(Continued)

FOREIGN PATENT DOCUMENTS

EP 1081609 A2 3/2001
WO 2010071709 A1 6/2010

OTHER PUBLICATIONS

European Office Action dated Dec. 10, 2018 in corresponding European Patent Application No. 12739151.4, 6 pages.
(Continued)

*Primary Examiner* — Ninos Donabed
(74) *Attorney, Agent, or Firm* — Ohlandt, Greeley, Ruggiero & Perle, L.L.P.

(57) ABSTRACT

There is provided a method that includes (a) receiving a request for access to data, (b) identifying a data store that stores the data, and (c) communicating with the data store, by way of an electronic communication, to access the data. There is also provided a system that performs the method, and a storage medium that includes a program module for controlling a processor to perform the method.

13 Claims, 10 Drawing Sheets

Related U.S. Application Data

(60) Provisional application No. 61/437,524, filed on Jan. 28, 2011, provisional application No. 61/437,406, filed on Jan. 28, 2011.

(51) Int. Cl.
*G06F 9/54* (2006.01)
*H04L 29/08* (2006.01)
*H04L 29/06* (2006.01)

(58) Field of Classification Search
CPC .... G06F 16/951; G06F 16/93; G06F 16/9535; G06F 16/24522; G06F 16/25; G06F 16/283; G06F 19/321
See application file for complete search history.

(56) References Cited

U.S. PATENT DOCUMENTS

| | | | |
|---|---|---|---|
| 6,381,598 B1* | 4/2002 | Williamowski | G06F 17/2755 704/1 |
| 7,114,037 B2 | 9/2006 | Agarwal et al. | |
| 7,206,851 B2 | 4/2007 | Delaney et al. | |
| 7,260,654 B1* | 8/2007 | Satapathy | H04L 12/2856 348/E7.069 |
| 7,340,447 B2 | 3/2008 | Ghatare | |
| 7,447,701 B2 | 11/2008 | Agarwal et al. | |
| 7,467,142 B2 | 12/2008 | Sinn et al. | |
| 7,509,407 B2 | 3/2009 | Miller | |
| 7,933,268 B1 | 4/2011 | Melman | |
| 8,271,514 B2 | 9/2012 | Geva | |
| 8,275,661 B1 | 9/2012 | Ponte et al. | |
| 8,326,899 B2 | 12/2012 | Harvey et al. | |
| 8,370,329 B2 | 2/2013 | Gutt et al. | |
| 8,375,113 B2 | 2/2013 | Sinn et al. | |
| 8,402,124 B1 | 3/2013 | Barillaud et al. | |
| 8,412,750 B2 | 4/2013 | Quin | |
| 8,521,700 B2 | 8/2013 | Chambliss | |
| 8,589,338 B2 | 11/2013 | Maes | |
| 8,825,872 B2 | 9/2014 | Reisman | |
| 2001/0013038 A1* | 8/2001 | Purcell | G06Q 10/087 |
| 2002/0018548 A1* | 2/2002 | Baldwin | H04Q 3/0029 379/207.02 |
| 2002/0019931 A1 | 2/2002 | Prinoth et al. | |
| 2002/0032675 A1* | 3/2002 | Williamowski | G06F 16/951 |
| 2002/0069282 A1 | 6/2002 | Reisman | |
| 2002/0120706 A1 | 8/2002 | Murphy | |
| 2002/0184161 A1 | 12/2002 | Chang | |
| 2003/0032432 A1* | 2/2003 | Red | H04Q 3/005 455/445 |
| 2004/0024762 A1 | 2/2004 | Agarwal et al. | |
| 2004/0030703 A1 | 2/2004 | Bourbonnais | |
| 2005/0004831 A1 | 1/2005 | Najmi et al. | |
| 2005/0027845 A1* | 2/2005 | Secor | G06Q 10/087 709/223 |
| 2005/0055325 A1 | 3/2005 | Dutt et al. | |
| 2005/0114454 A1 | 5/2005 | D'Angelo et al. | |
| 2006/0143705 A1 | 6/2006 | Sentoff | |
| 2006/0155824 A1 | 7/2006 | Motoyama et al. | |
| 2006/0155845 A1 | 7/2006 | Motoyama et al. | |
| 2006/0168197 A1 | 7/2006 | Motoyama et al. | |
| 2006/0184659 A1 | 8/2006 | Motoyama et al. | |
| 2007/0064630 A1 | 3/2007 | Olivier et al. | |
| 2007/0088702 A1 | 4/2007 | Fridella et al. | |
| 2007/0136349 A1* | 6/2007 | Shenbagam | G06F 16/258 |
| 2007/0143353 A1* | 6/2007 | Chen | G06F 12/0292 |
| 2007/0156793 A1 | 7/2007 | D'Souza et al. | |
| 2008/0133727 A1* | 6/2008 | Belqasmi | H04L 41/0226 709/223 |
| 2008/0198839 A1 | 8/2008 | Ku et al. | |
| 2008/0243784 A1* | 10/2008 | Stading | G06F 16/3331 |
| 2008/0243785 A1* | 10/2008 | Stading | G06F 16/9535 |
| 2008/0243786 A1* | 10/2008 | Stading | G06F 16/93 |
| 2008/0243787 A1* | 10/2008 | Stading | G06F 16/951 |
| 2008/0243799 A1* | 10/2008 | Rozich | G06F 3/0484 |
| 2008/0244429 A1* | 10/2008 | Stading | G06F 16/9038 715/764 |
| 2009/0024676 A1 | 1/2009 | Boyd et al. | |
| 2009/0240705 A1 | 9/2009 | Miloushev et al. | |
| 2010/0020720 A1* | 1/2010 | Belqasmi | H04L 41/0803 370/254 |
| 2010/0037161 A1* | 2/2010 | Stading | G06F 16/283 715/764 |
| 2010/0049790 A1 | 2/2010 | Schreiber | |
| 2010/0075641 A1 | 3/2010 | Schwartz | |
| 2010/0250712 A1 | 9/2010 | Ellison et al. | |
| 2011/0038287 A1* | 2/2011 | Agarwal | H04L 51/20 370/310 |
| 2011/0093610 A1 | 4/2011 | Rezaiifar et al. | |
| 2011/0213778 A1 | 9/2011 | Hess et al. | |

OTHER PUBLICATIONS

International Search Report and Written Opinion dated May 10, 2012 corresponding to International Patent Application No. PCT/US12/22939.

International Preliminary Report on Patentability dated Jan. 11, 2013 corresponding to International Patent Application No. PCT/US2012/022939.

International Preliminary Report on Patentability dated Aug. 8, 2013 corresponding to International Patent Application No. PCT/US2012/022939, 5 pages.

Mexican Office Action with English Translation, dated Jun. 19, 2014, corresponding to Mexican Patent Application No. MX/s/2013/008701, 6 pages.

Canadian Patent Office Action dated Mar. 19, 2015 from corresponding Canadian Patent Application No. 2,826,047, 5 pages.

Chinese Office Action dated Jan. 25, 2016 from corresponding Chinese Patent Application No. 201280010849.6, 11 pages.

Canadian Patent Office Action dated Oct. 29, 2015 from corresponding Canadian Patent Application No. 2,826,047, 5 pages.

European Patent Office Action dated May 4, 2016 for corresponding European Patent Application No. 12739151.4, 9 pages.

* cited by examiner

INVENTORY DATA ACCESS LAYER

CROSS-REFERENCE TO RELATED APPLICATIONS

The present application is a continuation of U.S. patent application Ser. No. 13/360,254, filed Jan. 27, 2012, which claims priority of (a) U.S. Provisional Patent Application Ser. No. 61/437,406, filed on Jan. 28, 2011, and (b) U.S. Provisional Patent Application Ser. No. 61/437,524, filed on Jan. 28, 2011, and the content of all of these applications is herein incorporated by reference.

BACKGROUND OF THE INVENTION

1. Field of the Invention

The present disclosure relates to data processing, and more specifically, to a server that accommodates requests for data, where the data resides in a distributed data storage system that includes a plurality of data repositories.

2. Description of the Related Art

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

A web-based computer system is often referred to as an Application Service Provider (ASP) system. For example, an ASP may provide a computer-based service to a customer over a network, e.g., the Internet. Conventional ASP systems include a platform layer that hosts a plurality of applications, where each of the applications contains one or more services and data.

An exemplary ASP system described by U.S. Pat. No. 7,708,196 to Palmieri et al (hereinafter "Palmieri et al."), which is herein incorporated by reference in its entirety, provides for a web-based ASP with a single platform that hosts multiple applications.

FIG. 1 is a block diagram of a prior art data processing system, i.e., system 100. System 100 is an ASP system in which customers 105 using customer devices (not shown) interface with a web service interface 110 to utilize applications 115, 130 and 145. Application 115 includes services 120 and a data store 125. Application 130 includes services 135 and a data store 140. Application 145 includes services 150 and a data store 155. Each of data stores 125, 140 and 155 includes a server (not shown) and one or more databases (not shown).

Application 115, for example, may include various risk management solutions such as comprehensive monitoring and portfolio analysis for identified companies. Customers 105, via web service interface 110, access application 115. Application 115 contains instructions to be executed with services 120. Services 120, when instructed by application 115, executes instructions on data in data store 125.

System 100 contains numerous technical drawbacks. The application/service/data relationship creates multiple duplicate data sets within application and services pairings. This redundant and duplicative data creates significant technology challenges to maintain data integrity and consistency let alone allow for updates. For example, one or more services 120 may be duplicative of one or more services 135 and one or more services 150. Similarly, data that is needed in each of data stores 125, 140 and 155 must be replicated in each of data stores 125, 140 and 155. That is, for each application that requires the same data, that same data must be replicated in the application's corresponding data store. As a result, if data requires updating, the same data must be updated for each application. This approach proves cumbersome to ensure data integrity amongst each application and further requires resources dedicated to ensure all common data is updated. In addition, when a service that is included in two or more of services 120, 135 and 150 is updated, replaced, or modified, an operator of system 100 must update, replace or modify the service in each of the affected applications 115, 130 and 145. Such activities are labor intensive, time consuming, and error prone.

SUMMARY OF THE INVENTION

There is provided a method that includes (a) receiving a request for access to data, (b) identifying a data store that stores the data, and (c) communicating with the data store, by way of an electronic communication, to access the data. There is also provided a system that performs the method, and a storage medium that includes a program module for controlling a processor to perform the method.

BRIEF DESCRIPTION OF THE DRAWINGS

A component or a feature that is common to more than one drawing is indicated with the same reference number in each of the drawings.

DESCRIPTION OF THE INVENTION

The present document discloses a system having an application layer that hosts multiple applications, a service layer that contains common services, i.e., services that can be utilized by any of the applications, an inventory data access layer, and a data layer that contains data repositories. The application layer is a web-based platform that may be accessed, for example, by a browser, a business to business connection, a mobile connection or an on premises connection. The multiple applications access the common services. The common services access, process and store data from the data layer, via the inventory data access layer.

Figure 1:
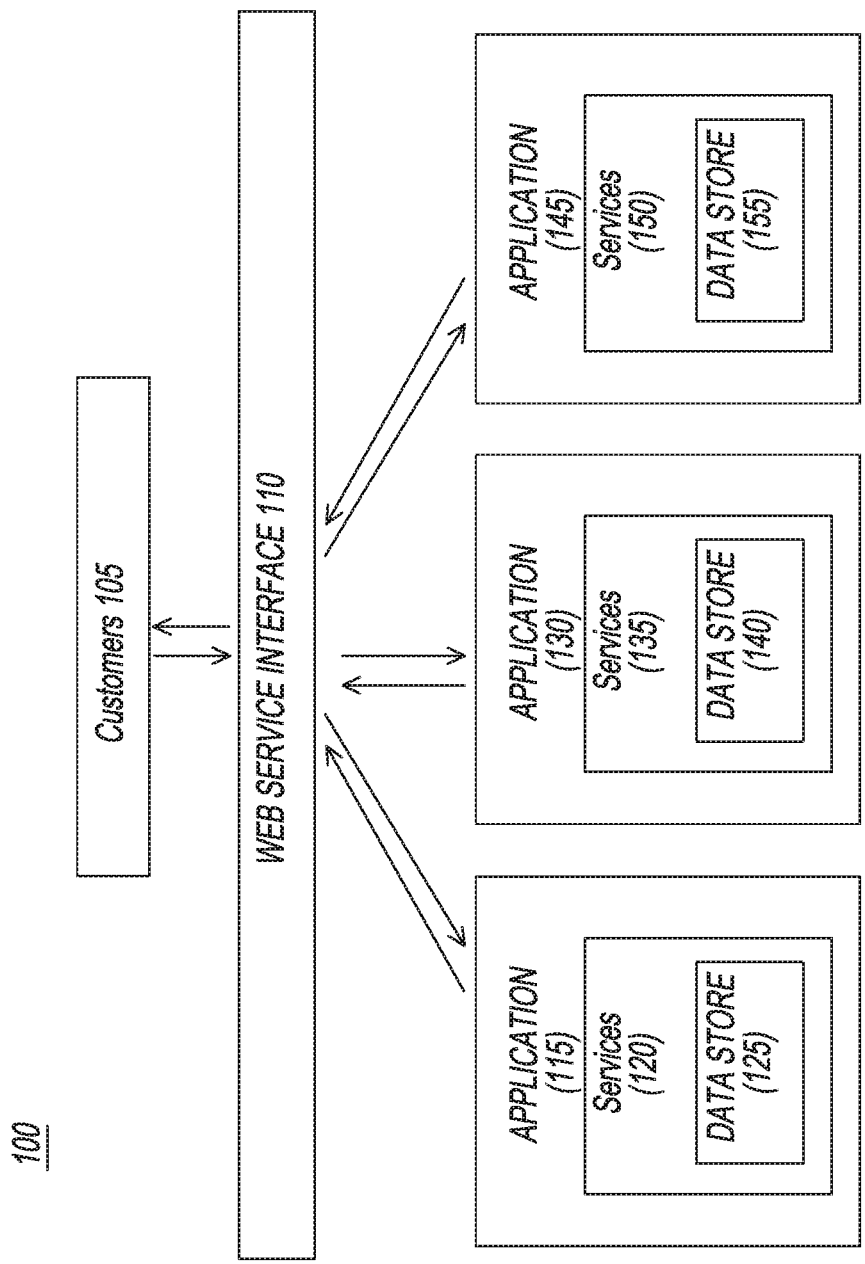
FIG. 1 is a block diagram of a prior art data processing system.
Figure 2:
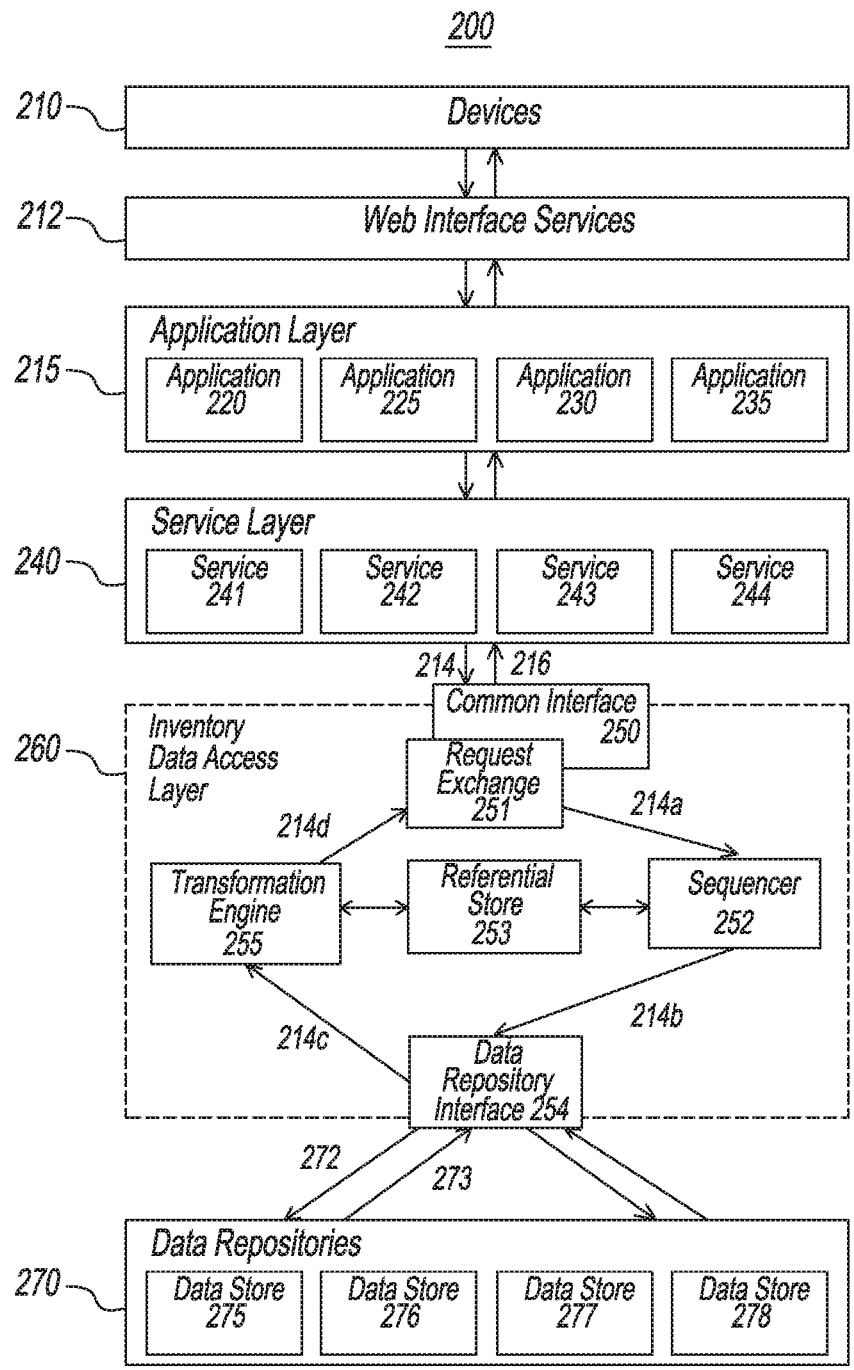
FIG. 2 is a block diagram of a system for employment of the present invention.

FIG. 2 is a block diagram of a system 200 for employment of the present invention. System 200 includes devices 210, a web interface 212, an application layer 215, a service layer 240, an inventory data access layer (IDAL) 260, and data repositories 270.

Application layer 215 hosts a plurality of applications, e.g., applications 220, 225, 230 and 235. Application layer 215 may host any desired number of applications.

Service layer 240 hosts a plurality of services, e.g., services 241, 242, 243 and 244. Service layer 240 may host any desired number of services.

Data repositories 270 include a plurality of data stores, e.g., data stores 275, 276, 277 and 278, that store data. Each of data stores 275, 276, 277 and 278 includes a server (not shown) and one or more databases (not shown) for storage of data. Data repositories 270 may include any desired number of data stores.

Devices 210 access application layer 215, by way of an electronic communication, via web interface 212. Each of applications 220, 225, 230 and 235 can, by way of electronic communications, access any of services 241, 242, 243 and 244, which, by way of electronic communications, communicate with IDAL 260, which by way of electronic communications, can access any of data stores 275, 276, 277 and 278.

For example, assume that service 241 wishes to read some data that is stored in data store 275. Service 241 sends, to IDAL 260, a request for access to the data. In this case, the request is a read request. IDAL 260 receives the request, identifies data store 275 as being the data store that stores the data, and communicates with data store 275 to access the data. Since the request is a read request, IDAL 260 reads the data from data store 275, and sends, to service 241, a response that includes the data.

Similarly, assume that service 241 wishes to write some data to data store 275, for example to update the data. Service 241 sends, to IDAL 260, a request for access to the data. In this case, the request is a write request that includes new data. IDAL 260 receives the request, identifies data store 275 as being the data store that stores the data, and communicates with data store 275 to access the data. Since the request is a write request, IDAL 260 writes the new data to data store 275, and sends, to service 241, a response that includes a confirmation that the writing has been performed.

Assume that service 241 is a supplier assessment service that provides details about a supplier's credit worthiness. Service 241 accesses, processes, and stores, in data repositories 270, resulting data relating to specific supplier assessments. When application 220 requests details on a specific supplier's assessment, service 241 processes that request, consequentially updating data results in data repository 270. If application 225 requests the same details on the same specific supplier's assessment, service 241 processes that request through data repository 270, which utilizes the resulting data from application 220's request. There is no need to maintain independent and dedicated data result sets in data repositories 270 for the same request. If that supplier's data is updated in data repositories 270, the result set is likewise updated by data repositories 270. There is no need to have repetitive updating with a shared result set. When the result set in data repositories 270 is updated, a notice is sent through service 241 to applications 220 and 225.

IDAL 260 includes a common interface 250, a request exchange 251, a transformation engine 255, a referential store 253, a sequencer 252, and a data repository interface 254.

IDAL 260 can handle requests of a multiple types, and in general, any desired number of types of requests.

A request of a first type may be a request for a business information report. GetReport(Company A) is a request for a business information report about Company A. It returns a postal address for Company A, and financial payment history for Company A.

A request of a second type may be a request for a credit score. GetScore(Company A) is a request for a credit score about Company A. It returns a number that represents a current credit score for Company A, and a number that represents a previous credit score for Company A.

Assume that service 242 issues a request 214 for a business information report about Company A, i.e., GetReport(Company A), and that the data for the report is stored in data store 276. Thus, request 214 is a read request. Request 214 is a request for access to data in data repositories 270, but does not specifically identify data store 276 as the particular data store that has the data stored therein.

Common interface 250 provides a central point of access to IDAL 260 for services in service layer 240. Common interface 250 receives request 214 from service 242, validates request 214, e.g., validates syntax, and passes request 214 to request exchange 251.

Request exchange 251 is a temporary data store for an incoming request from service layer 240 and an outgoing response to service layer 240. Request exchange 251 stores request 214, and passes it along, in the form of a request 214a, to sequencer 252.

Sequencer 252 reads request 214a, and presents the content of request 214a to referential store 253.

Referential store 253, when given a request of a particular request type from sequencer 252, returns several attributes, namely (a) an identifier of a data store that contains data items to be provided in response to the request, (b) connection and communication protocols to access the data store, and (c) an output type of the response. Some exemplary connection and communication protocols are Simple Object Access Protocol (SOAP) and Hyper Text Transfer Protocol (HTTP). An exemplary output type is Extensible Markup Language (XML). For example, for GetReport(Company A), referential store 253 returns (a) an identifier of data store 276, (b) a communication protocol, and (c) an output type of the response.

Data store 276 is a member of a plurality of identifiable data stores in data repositories 270. Referential store 253 is thus a dictionary of request attributes and data location attributes, and maps a request to a data store.

Sequencer 252 receives the attributes from referential store 253, and appends them to the request, thus yielding an augmented request 214b, and passes augmented request 214b to data repository interface 254.

Data repository interface 254 receives augmented request 214b, and handles connection and communication to data repositories 270, and the servers of the individual data stores, in accordance with the connection and communication protocols. For example, data repository interface 254 uses (a) the identifier of data store 276, and (b) the connection and communication protocol attributes, to establish a connection to data store 276, and then passes to data store 276, via a request 272, the content of the original request. Data repository interface 254 retains the output type of the response (received as part of request 214b) for later use.

Data store 276 receives request 272, processes request 272, and provides the requested data in a response 273. Data store 276 includes a server (not shown) and one or more databases (not shown). The server processes the request and accesses the data in the one or more databases.

Data repository interface 254 receives response 273, and performs some preliminary formatting of the response in accordance with the output type of the response (received as part of request 214b). Thereafter, data repository interface 254 sends, to transformation engine 255, a response 214c. Response 214c includes the original request and the data obtained from data store 276.

Transformation engine 255 presents the request to referential store 253.

Referential store 253, in response to a request from transformation engine 255, returns rules for data treatment and data formatting to produce a response to the original request. Referential store 253 can accommodate any desired number of response formats. In the present example, referential store 253 returns rules for data treatment and data formatting to produce a response to the GetReport(Company A) request.

Transformation engine 255 produces the response in accordance with the rules from referential store 253, and passes a formatted response 214d to request exchange 251.

Request exchange 251 passes formatted response 214d, to common interface 250.

Common interface 250 passes formatted response 214d, in the form of a response 216, to service 242, i.e., the original calling service.

For another example, assume that request 214 is a request for data that includes a first data item and a second data item, where the first data item is stored in data store 277 and the second data item is stored in data store 278. The request may be, for example, a request for a report that includes some historic financial data, and some current financial data. Referential store 253 identifies data store 277 as storing the first data item, and identifies data store 278 as storing the second data item. Referential store 253 also identifies connection and communication protocols to access data store 277, and connection and communication protocols to access data store 278. Data repository interface 254 communicates with data store 277 to access the first data item, and communicates with data store 278 to access the second data item.

In system 200, a particular item of data, for example, an item of data in data store 275, can be accessed by any of the applications in application layer 215. If that data is updated, it need not be updated in multiple places, but instead, only in data store 275. The updating of the data, or a change to a formatting of the data does not require a corresponding change to either of service layer 240 or application layer 215.

Data store 275 can be a legacy storage system, and data store 278 can be a new storage system. Nevertheless, through IDAL 260, any service in service layer 240 can access either of data store 275 or data store 278, regardless of whether the data stores are legacy storage systems or new storage systems.

Figure 3:
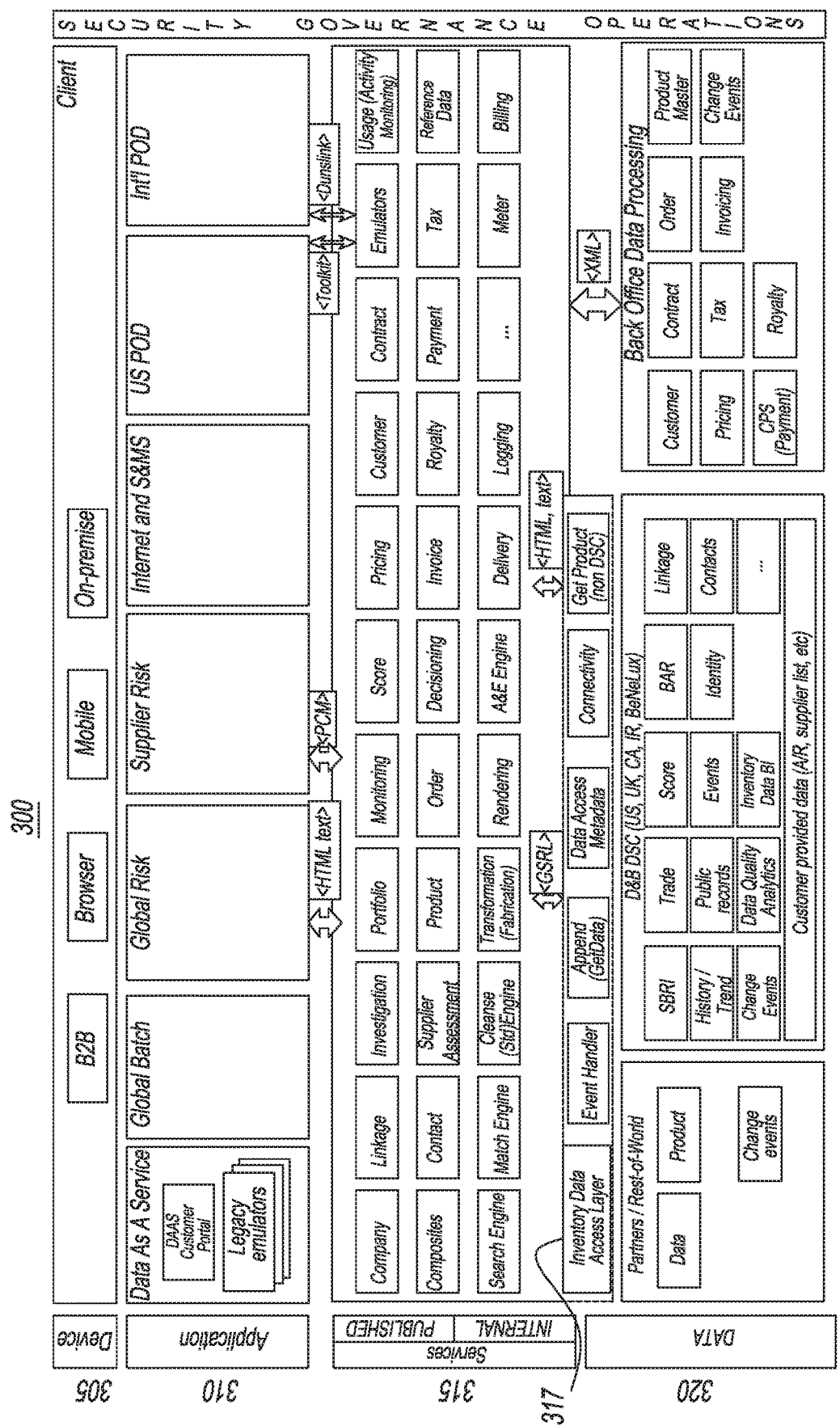
FIG. 3 is a block diagram of a system for employment of the present invention.

FIG. 3 is a block diagram of a system 300 that is being contemplated by Dun & Bradstreet (D&B), for employment of the present invention. System 300 includes devices 305, an application layer 310, a services layer 315, an IDAL 317 and data repositories 320, which operate similarly to devices 210, application layer 215, service layer 240, IDAL 260, and data repositories 270.

Device layer 305 provides for multiple methods of access including, but not limited to: business to business, browser, mobile, and on premise.

Application layer 310 hosts multiple applications, where each application represents a different part of the D&B lines of business. All applications in platform layer 310 perform processing that controls a User Interface/User Experience (UI/UX) for an associated customer community. Additionally, all of the applications use a common set of services within service layer 315. In this way data from data repositories 320 is consistent across multiple applications according to different customer needs.

Applications in application layer 310 may include, but are not limited to: Data as A Service (DaaS), Global Batch, Global Risk, Supplier Risk, Internet and S&MS, US POD and Int'l POD. An application designated as "POD" (point of departure) represents a then-current legacy application, or applications.

The DaaS application is a business to business (B2B) concept that allows a programmatic interface into D&B hosted data. This allows a customer of D&B to integrate D&B data directly into the customer's processing through standard program calls instead of needing a human involvement.

The Global Batch application refers to contracted work handled by D&B to receive files from its customers and perform a standard established set of processing such as, but not limited to: data cleansing, data append, deduping and identifying company linkage.

The Global Risk application allows a customer to manage any credit the customer extends to additional parties. A customer can manage a portfolio of additional parties, e.g., the customer's respective customers, along with tracking the customer's risk exposure, perform analysis, extrapolate data into a result based on a configurable occurrence, e.g., "what if's", and receive alerts for additional parties risk changes.

The supplier risk application is similar to the Global Risk application, but further allows a customer to track suppliers.

The Internet and S&MS application is a sales and marketing services application that assists a customer in growing a business with functionality that includes, but is not limited to: a new customer acquisition, a lead generation, and a new segment identification.

Service layer 315 includes numerous services, and is further broken into internal services and published services. The published services are services that an application from application layer 310 can invoke. The internal services are services that are not available for direct access from applications in application layer 310.

IDAL 317 is the vehicle by which services within service layer 315 access data within data repositories 320.

Data repositories 320 includes, but is not limited to: external data, i.e., partners/rest of world, internal data, i.e., D&B Data Supply Chain (DSC), and Back Office Data Processing.

Data layer 320 includes data from partners, and data from D&B. Back office processing encompasses applications for accounting, billing, customer management, financial reporting, tax, credit card processing, pricing, royalty, and order management.

FIG. 3 also illustrates a communication protocol between application layer 310 and services layer 315 via HTTP/SOAP, PCM, Toolkit and DUNSLink. A JMS protocol (not shown) may also be used, but preferably in a more limited capacity.

DUNSLink is a protocol that may be used to obtain data from a US mainframe risk database (AOS). DUNSLink may also be used to communicate between services layer 315 and data layer 320. Preferably, DUNSLink is used to communicate between D&B data supply chain (D&B DSC) of data repositories 320 and shared services within service layer 315.

Toolkit is an externally exposed application in communication with internal applications of application layer 310 and a plurality of risk-based services in service layer 310. Toolkit is an application-to-application interface.

Overall, the protocols assist in insulating application layer 310, services layer 315 and data repositories 320. That is, the protocols provide for exchange of information, e.g., data, amongst different layers.

In operation, system 300 allows a customer with access to interfaces within device layer 305 to access applications within application layer 310. Applications within application layer 310 do not include any local services. Instead, all services associated with a particular application are contained in services layer 315. As a customer accesses a particular application, the application will call an associated service. Services layer 315 is further in communication with data layer 320 via IDAL 317. Services within service layer 315 access, process and store data from data repositories 320. Storage of data within each service typically occurs prior to the service being called by the application. That is, services within service layer 315 store data relevant to the particular service to minimize time of response to an application call for data.

For example, modular system 300 may operate as follows:

1. A B2B customer application makes a request to a DaaS application for company information. The B2B customer passes a userid/password along with a DUNSNumber of a company the B2B customer is interested in obtaining information about.
2. The DaaS application authenticates the credentials passed in the webservice request.
3. The DaaS application makes a call to a company service and passes the DUNSNumber.
4. The company service accesses data layer 320 and specifically accesses data relating to a Trade, a Score, a BAR, a linkage, and a Public Record through a "get data" internal service.
5. The data is retrieved and then formulated into a proper format resulting in a proper response and then returned to the DaaS application. At the same time, the company service calls a billing service that records the transaction. The billing service invokes a backend order application that further records the transaction.
6. The DaaS application returns the proper response to the customer.

Figure 4:
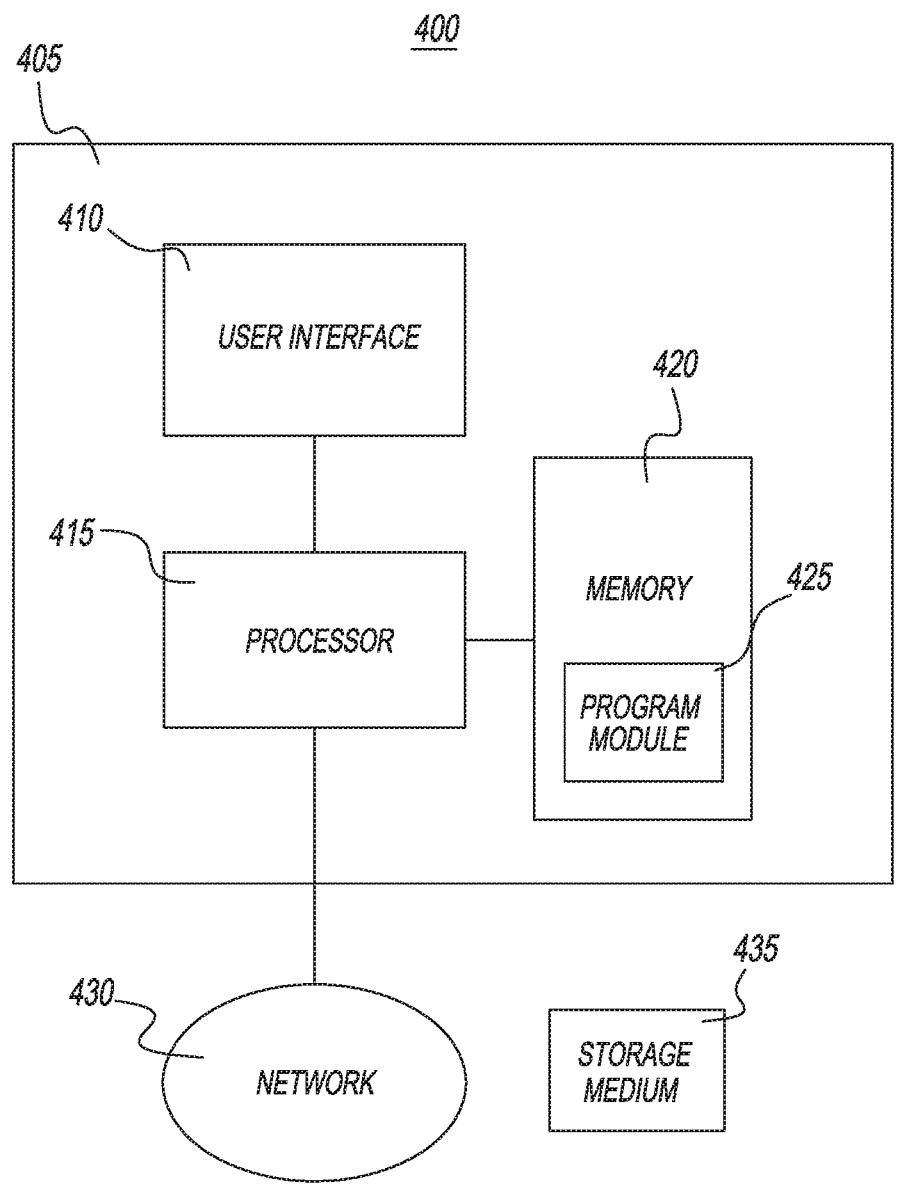
FIG. 4 is a block diagram of a system that performs operations of the inventory data access layer shown in FIG. 2.

FIG. 4 is a block diagram of a system 400 that performs operations of IDAL 260. System 400 includes a computer 405 coupled to a network 430, e.g., the Internet. Via network 430, computer 405 is communicatively coupled to devices (not shown) in service layer 240 and data repositories 270.

Computer 405 includes a user interface 410, a processor 415, and a memory 420. Although computer 405 is represented herein as a standalone device, it is not limited to such, but instead can be coupled to other devices (not shown) in a distributed processing system.

User interface 410 includes an input device, such as a keyboard or speech recognition subsystem, for enabling a user to communicate information and command selections to processor 415. User interface 410 also includes an output device such as a display or a printer. A cursor control such as a mouse, track-ball, or joy stick, allows the user to manipulate a cursor on the display for communicating additional information and command selections to processor 415.

Processor 415 is configured of logic circuitry that responds to and executes instructions.

Memory 420 is a tangible storage medium that stores data and instructions for controlling the operation of processor 415. Memory 420 may be implemented in a random access memory (RAM), a hard drive, a read only memory (ROM), or a combination thereof. One of the components of memory 420 is a program module 425.

Program module 425 contains instructions for controlling processor 415 to execute the operations of IDAL 260.

The term "module" is used herein to denote a functional operation that may be embodied either as a stand-alone component or as an integrated configuration of a plurality of sub-ordinate components. Thus, program module 425 may be implemented as a single module or as a plurality of modules that operate in cooperation with one another. Moreover, although program module 425 is described herein as being installed in memory 420, and therefore being implemented in software, it could be implemented in any of hardware (e.g., electronic circuitry), firmware, software, or a combination thereof.

While program module 425 is indicated as already loaded into memory 420, it may be configured on a storage medium 435 for subsequent loading into memory 420. Storage medium 435 can be any tangible storage medium that stores program module 425 thereon. Examples of storage medium 435 include a floppy disk, a compact disk, a magnetic tape, memory sticks, a read only memory, an optical storage media, universal serial bus (USB) flash drive, a digital versatile disc, or a zip drive. Storage medium 435 can be a random access memory, or other type of electronic storage, located on a remote storage system and coupled to computer 405 via network 430.

System 400 can also be employed to perform operations of IDAL 317.

Figure 5:
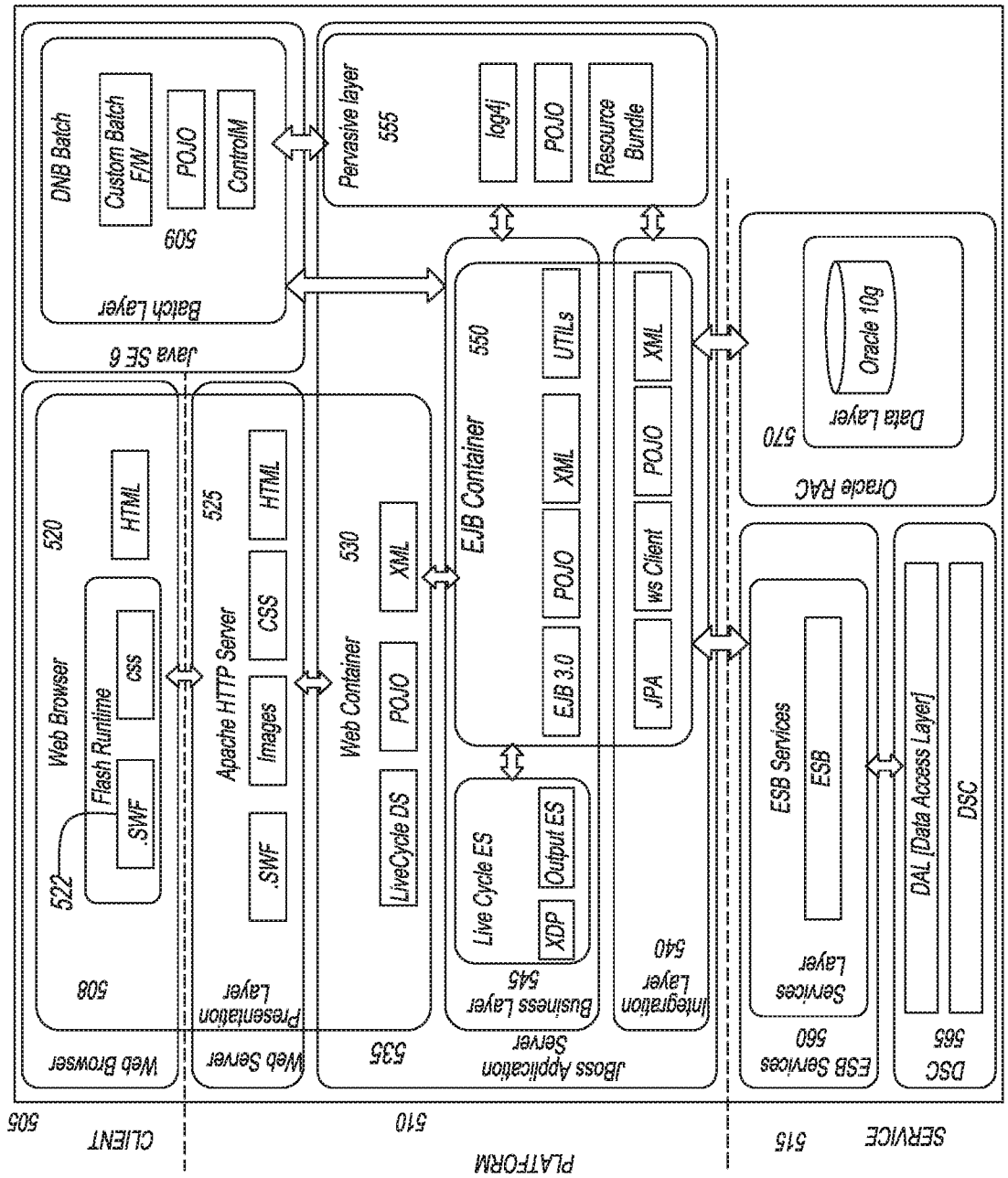
FIG. 5 is block diagram of another system architecture.

FIG. 5 is another block diagram of a modular architecture system 500 and highlights communication amongst a client layer 505, a platform layer 510, and a service layer 515. Client layer 505 and platform layer 510 share a batch layer 509 and a presentation layer 508. Client layer 505 can represent a customer browser and resides on a customer device or customer computing platform, e.g., a personal computer. Client layer 505 can further incorporate a flash program with a .swf file. The embedded flash program may enable the customer device to perform a plurality of operations without requiring program calls to platform layer 510. In this fashion, the client layer 505 is front loaded and can provide significant performance improvements by allocating resources to client layer 505 via the flash program. Client layer 505 Presentation layer 508 further includes a web browser 520, a server 525 and a web container 530. Platform 510 also includes an application server 535 that includes an integration layer, a business layer and web container 530 of presentation layer 508. Server 535 of platform layer 510 further hosts a business layer 545, an integration layer 540, an EJB container 550 and a pervasive layer 555. Service layer 515 communicates with platform layer 510. Applications in platform layer 510 access services in service layer 515 to access data and common business process applications (not illustrated). Specifically, service layer 515 hosts Services 560 and Oracle 570 that both communicate with integration layer 540 of platform layer 510. Service 515 further includes a DSC 565. Platform layer 510 and service layer 515 reside in a secure portion of a network. Both platform layer 510 and service layer 515 reside on physically different hardware so they are independently scalable.

Figure 6:
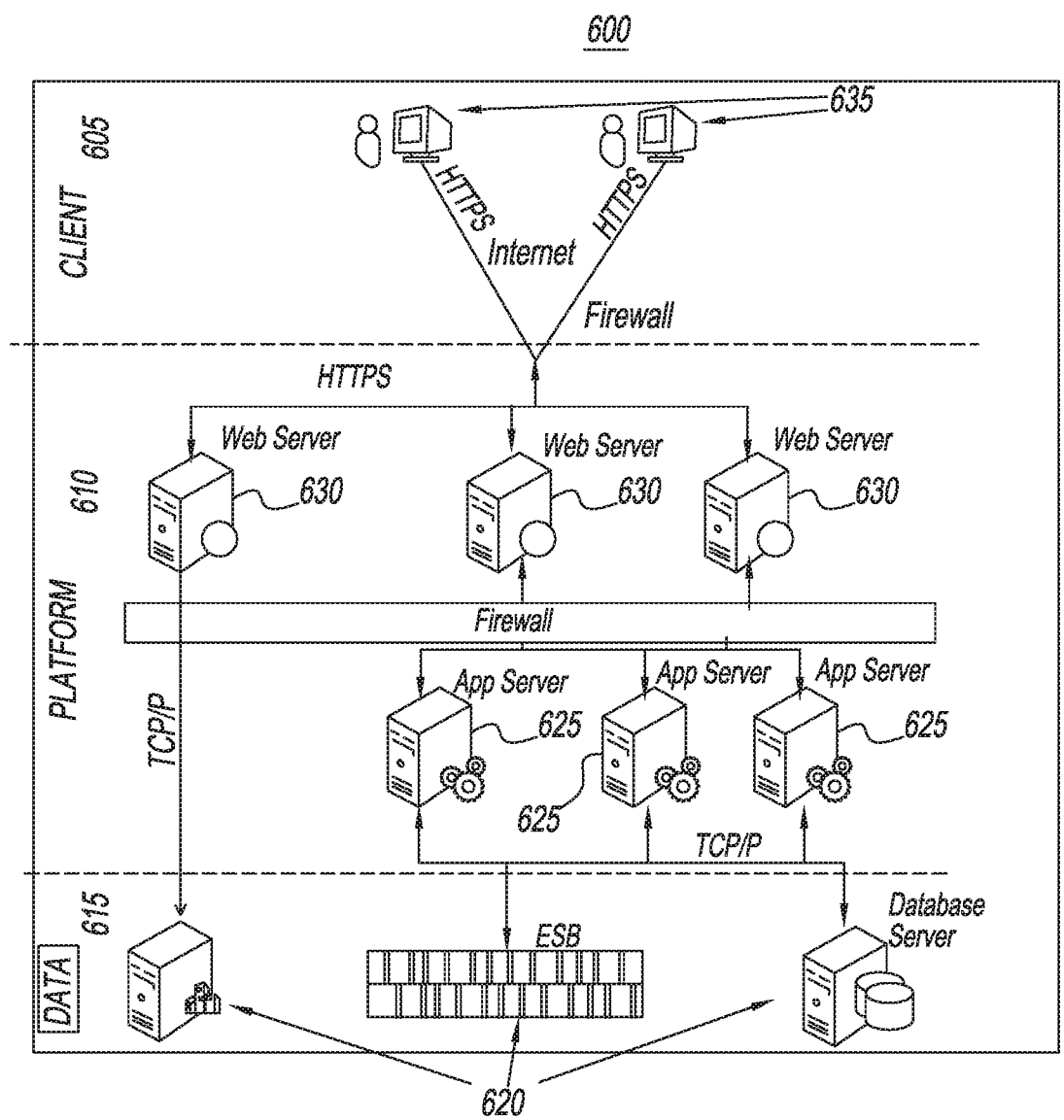
FIG. 6 is block diagram of another system architecture.

FIG. 6 is another representation of a modular architecture system 600 with a client layer 605, a platform layer 610 and a data layer 615. Data layer 615 includes data servers 620 that contain information such as business information. Platform layer 610 includes application servers 625 and web servers 630. Application servers 625 are coupled to a processor (not shown) and communicate with data servers 620.

The processor instructs application servers to process data contained in data servers 620 to process specific information. Application servers 625 are configured to store the specific information post processing. Platform 610 also includes web servers 630 that communicate with client layer 605. Client layer 605 includes customers 635 with access terminals, e.g., a computer. Customers 635, via the computer, access web server 630 of platform layer 610. Web servers 630 further communicate with application servers 625 to process and provide data stored therein. In instances where data updated in data layer 615 on data servers 620, the update is propagated into platform layer 610 when application servers 625 access data servers 620. In this fashion updating data becomes centrally located in data layer 615 and obviates a need to duplicate an update elsewhere.

Figure 7:
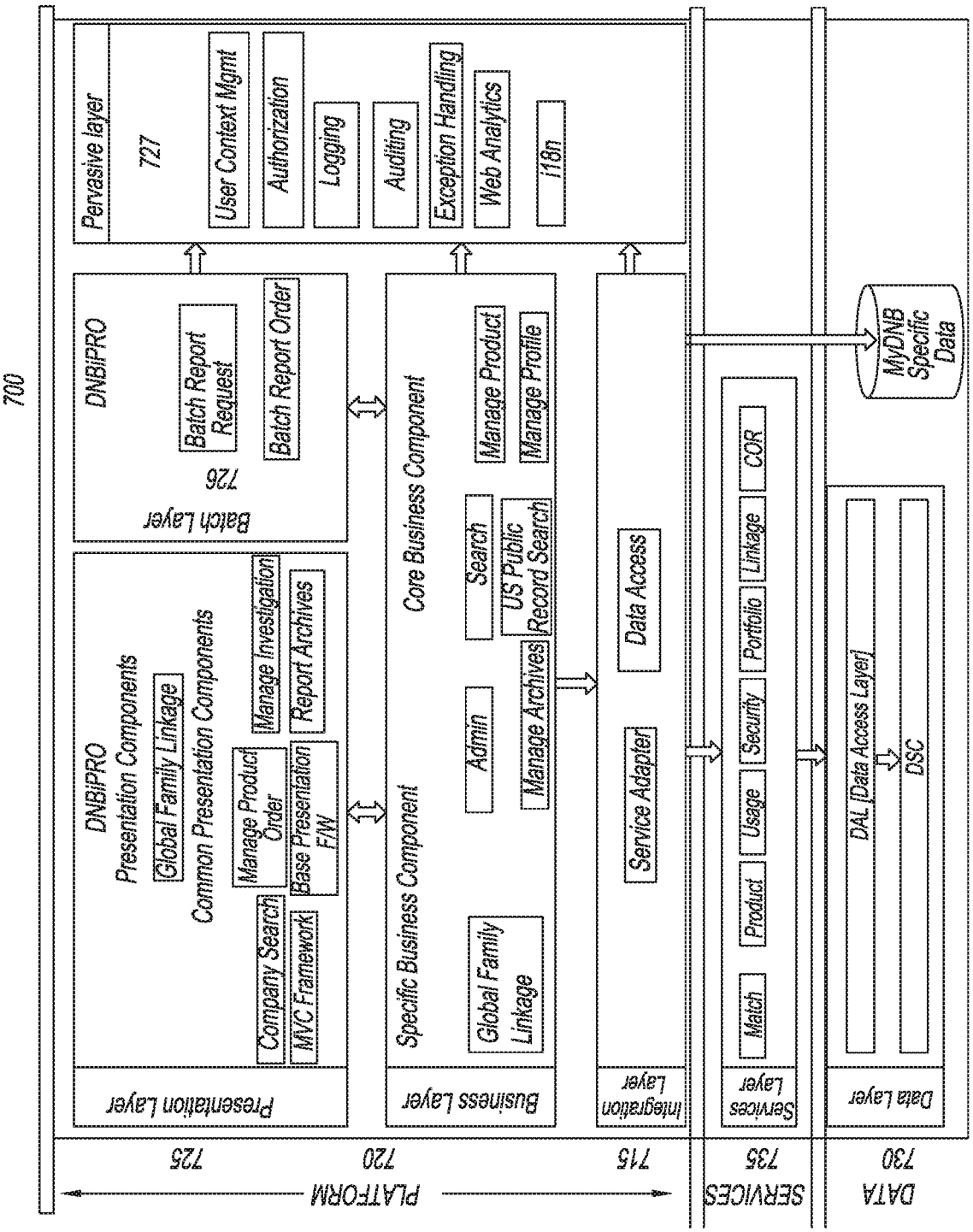
FIG. 7 is block diagram of another system architecture.

FIG. 7 illustrates another web-based modular architecture system 700 with particulate focus on a platform layer 705, a services layer 735 and a data layer 730. Similar to ASP system 400 in FIG. 4, ASP system 700 in FIG. 7, provides for multiple sub-layers within platform layer 705. Specifically, platform layer 705 includes an integration layer 715, a business layer 720, a presentation layer 725, a batch layer 726 and a pervasive layer 727. Arrows that connect each of the sub-layers described demonstrate communication paths. Data layer 730 communicates with services layer 735 which further communicates with integration layer 715 of platform layer 705.

Presentation layer 725 provides the ability to access the system and perform various operations via the application graphical user interface (GUI) screens. Presentation layer 725 can be broken into two components: a set of common presentation components and a set of application specific components. Common presentation components perform common business functionalities within the system 700. In particular, these functionalities may include, but are not limited to: company search, manage product order, manage investigation, MVC framework, Base Presentation Framework and Report Archives. Company search are a set of reusable GUI panels that provide for the ability to perform various types of search on data, e.g., business data. The GUI panels are built with a set of fine grain user interface controls and are easy to configure and plug-in to any screen within and across applications. For example the GUI panels may include, but are not limited to: a Company Search, a DUNS Search and a Search by Phone Number. Manage Product Order includes another set of GUI panels that allow for ordering various products. The Manage Product Order includes, but is not limited to: providing functionality of displaying popular reports, displaying all available products for a particular country and finally allows for placement of an order. Manage Investigation is a set of GUI panels that provide the ability to place an order for an investigation when the desired information is not yielded using a regular search. This allows a user to perform all the functionalities associated with an investigation process, including, but not limited to: displaying most popular products and displaying a status of the investigation process. MVC framework includes components to implement the client side of MCV framework including, but not limited to tools along with possible extensions and/or customizations. Base Presentation Framework includes various design pattern and design principles applicable to components in the presentation layer. The patterns and principles help enforce a universal design within various presentation layer components across applications. One instance of base framework components includes Report Archives. Report Archives are a set of necessary GUI panels that manage a report archive such as listing archived reports, displaying read and unread archives, and displaying recycled reports.

System 700 realizes the business functionalities components that are unique. These components are also exposed as a set of coarse grained business functionalities that are required to support all the functionalities that are not available as part of the code set of business functionalities. System 700 also provides for GlobalFamilyLinkage. GlobalFamilyLinkage provides necessary interfaces to allow users to view Global Family Linkage information on companies worldwide. A few key set if functionalities include, but are not limited to: performing a DUNS Search, getting a count of Family Members and displaying the count of matched companies.

Integration layer 717 enables business layer 720 to interact with services layer 735 in addition to applications that store specific data. Some components of the integration layer include, but are not limited to: Service Adapters Component and Data Access Components. Service Adapters Component enable business layer 720 to invoke various services from the services layer 735. Data Access Components enable access to data from the applications that store specific data and also provide an object view of data by implementing necessary O/R mapping.

Pervasive layer 727 includes logical components that are used to implement core infrastructural functionalities that are cross-cutting across the layers of the system. Some key set of components in the pervasive layer 727 include, but are not limited to: User Context Mgmt, Authorization, Logging, Auditing, Exception Handling, Web Analytics and i18n. User Context Mgmt provides user context management and related services. Authorization is a component that provides role based access control to various application functionalities. Logging is a component that provides logging of various exceptions, errors and other information in the system. Auditing is a component that implements audit history of user operations, e.g., a history of product orders, and deletion of reports from the archive. Exception Handling is a component that catches and gracefully handles all the exceptions in the system. Web Analytics is a component that captures web analytics data to determine the usage statistics of various pages of the application and other related information. i18n is a component that provides necessary support for internationalization and localization of application pages.

Services layer 735 implements all the business functionalities and exposes them as a set of Web Services. Examples of a key set of services include, but are not limited to: Company, Product, Usage, Security, Portfolio, Linkage and COR. Company services expose interfaces to search for a company. Examples of a search and resulting match include, but are not limited to: a Company Name, a DUNS number and a Phone number. Product services include interfaces to retrieve the actual reports offered by system applications. Reports can be fabricated reports (in PDF/HTML/TXT format). Usage services include interfaces that primarily deal with the charging aspect of ordering a product. Usage services relate to billing of ordered reports. Security services include necessary interfaces for authenticating and providing entitlements a user. Portfolio services include interfaces for the archived products. A few key set of interfaces include, but are not limited to: retrieve, modify, refresh and recycle archived products. Linkage services include, but are not limited to: interfaces to retrieve the company linkage information. Linkage services can be used to retrieve the family tree information like global/domestic headquarters, branch and subsidiaries. COR services include interfaces to allow self-update by the customer and other related functionalities.

Data layer 730 contains various data sources that store company information as well as customer data. Data sources used in data layer 730 include, but are not limited to: DNBiProSpecificData and DSC. DNBiProSpecificData stores any data that is specific to DNBiPro.COM and are not stored within DSC. For example: Application specific user preference data (like search results preferences, mailbox preferences, favorite reports, and custom reports. DSC stores a company information, customer data, web analytics data, portfolio data.

Figure 8:
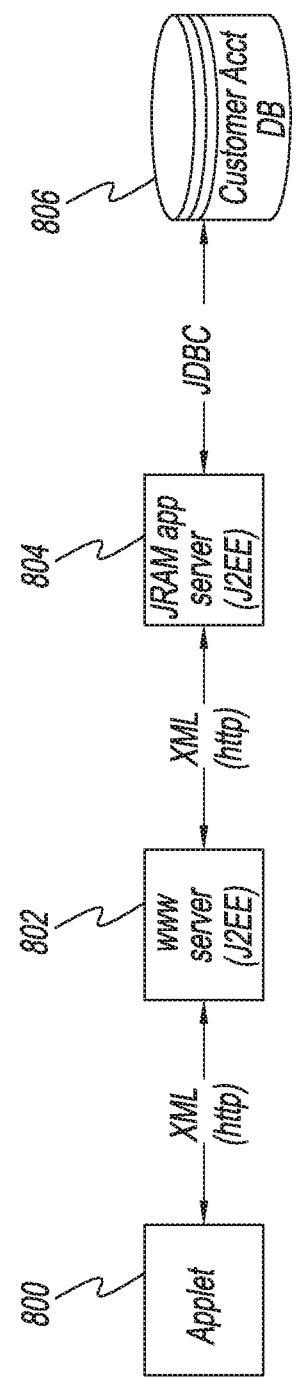
FIG. 8 shows an example user interface for an embodiment of an eRAM system.

FIG. 8 shows an example user interface for one embodiment of an eRAM system. The eRAM system includes an applet 800, a server 802, an application server 804, and a customer account database 806. In this example, the eRAM system is Java 2 Platform, Enterprise Edition (J2EE) compatible, cross-platform, cross-database, internationalized, and supports hundreds of concurrent users accessing databases containing millions of accounts. Other embodiments are implemented using various platforms, processors, servers, operating systems, database systems, and other technologies. Applet 800 is a Java applet that sends and receives extensible markup language (XML) and hypertext markup language (HTML) data to and from server 802. Server 802 sends and receives XML and HTML data to and from application server 804. Application server 804 has a java database connectivity (JDBC) interface with customer account database 806.

Figure 9:
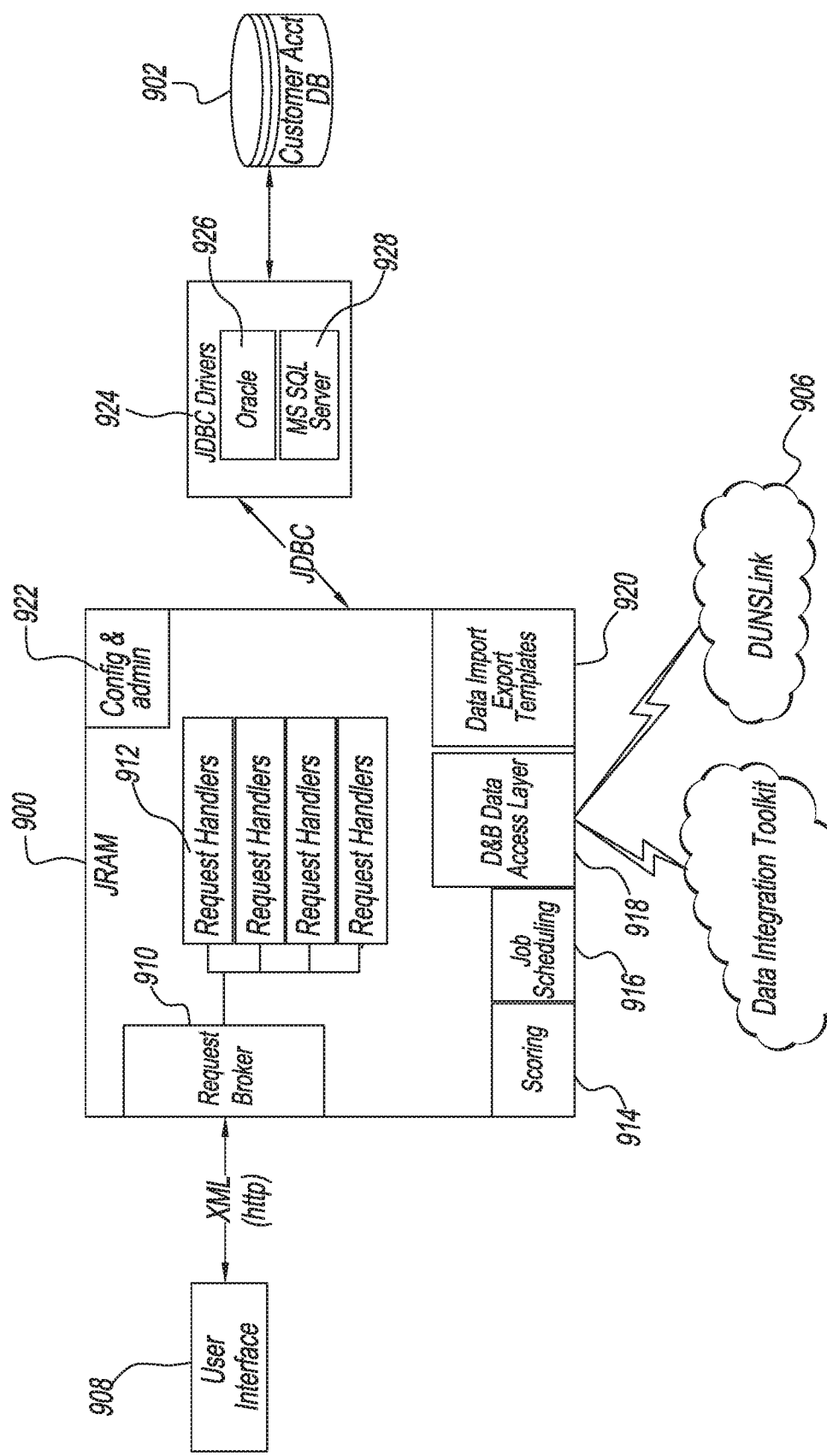
FIG. 9 shows an example system architecture for components in one embodiment of the eRAM system.

FIG. 9 shows an example system architecture for components in one embodiment of the eRAM system. In this example, java risk assessment manager (JRAM) 900 provides application functions and services for the eRAM system. Inputs to JRAM are customer information, which resides on a customer account database 902, information from a data integration toolkit 904 and a DUNSLink™ 906, information input by a user interface 908. Data integration toolkit 904 provides the eRAM system with the following functionality: database access, matching, and data products. User requests for functions come through user interface 208 and are fielded by a request broker 910. Request handlers 912 handle various types of requests and use shared services. Shared services include scoring 914, job scheduling 916, and data access layer 918. Scoring 914 provides various business scores. Job scheduling 916 manages batch functions. Data access layer 918 provides access to data integration toolkit 904 and DUNSLink™ 906. Users use data import and export templates 920 to import and export data from their own applications to and from the risk assessment management system. Configuration and administration 922 is a shared service used by administrators to define configurations and users and their entitlements. Java database connectivity (JDBC) 924 is an application program interface (API) for connecting JRAM 900 to customer account database 902. JDBC 924 includes access to Oracle 926 and Microsoft SQL servers 928.

Figure 10:
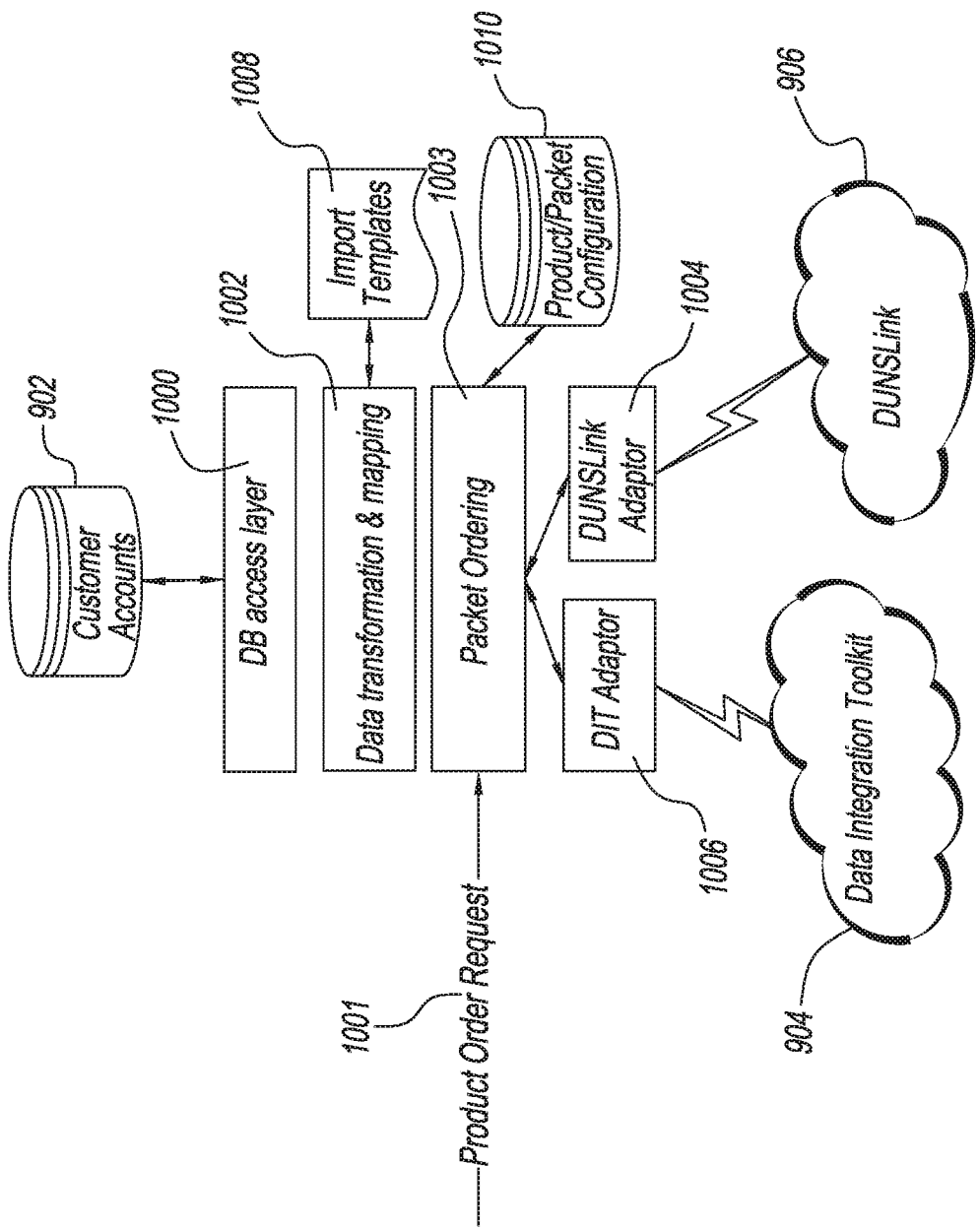
FIG. 10 shows more detail for the data access layer of the system in FIG. 9.

FIG. 10 shows more detail for the data access layer 918. This illustrates how a customer enhances customer information in customer account database 902 by, for example, retrieving more current information. To retrieve a packet needed by a data transformation and mapping component 1002 for a particular account in a product order request 301 that is not resident on customer accounts 902, access is through either a packet ordering component 1003 from a DUNSLink™ adaptor 1004, if it is United States information, or a data integration toolkit (DIT) adaptor 1006, if it is international information. A product order request is for a data product, such as a business information report or scoring information. The packet is retrieved from a central location and then transferred back to the customer's location. Before the packet is transferred and stored in the customer's database, certain elements in the packet are transformed according to the product desired by data transformation and mapping component 1002, which may access import templates 1008.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

What is claimed is:

1. A method comprising:
   receiving a request for access to data, wherein said request does not identify a data store that stores said data and wherein said request is a read request;
   obtaining from a referential store (a) an identifier of said data store that stores said data, wherein said data store is one of a plurality of data stores, and (b) a protocol to access said data store;
   communicating with said data store through an interface, by way of an electronic communication, to access said data, wherein said interface is communicatively coupled to said plurality of data stores and utilizes said identifier and said protocol to establish a connection to said data store, and wherein said communication comprises reading said data from said data store;
   receiving a response from said data store via said interface;
   receiving from said referential data store, rules for data formatting to produce a response to said request;
   transforming said response from said data store in accordance with said rules, thus yielding a formatted response which includes said data; and
   transmitting said formatted response in a response to said request.

2. The method of claim 1,
   wherein said data store includes a server, and
   wherein said communicating comprises communicating with said server in accordance with said protocol.

3. The method of claim 1, wherein said communicating comprises forwarding to said data store, content from said request.

4. The method of claim 1,
   wherein said data includes a first data item and a second data item,
   wherein said data store is a first data store that stores said first data item, said identifier is a first identifier, and said protocol is a first protocol,
   wherein said obtaining further comprises obtaining, from said referential store, (a) a second identifier of a second data store that stores said second data item, wherein said second data store is one of said plurality of data stores, and (b) a second protocol to access said second data store, and wherein said communicating comprises communicating with said first data store to access said first data item, and further comprises communicating with said second data store, through said interface, to access said second data item, wherein said interface utilizes said second identifier and said second protocol to establish a connection to said second data store.

5. A system comprising:

a processor; and a memory that contains instructions that are readable by said processor to cause said processor to performs actions of:

receiving a request for access to data, wherein said request does not identify a data store that stores said data and wherein said request is a read request;

obtaining from a referential store (a) an identifier of said data store that stores said data, wherein said data store is one of a plurality of data stores, and (b) a protocol to access said data store;

communicating with said data store through an interface, by way of an electronic communication, to access said data, wherein said interface is communicatively coupled to said plurality of data stores and utilizes said identifier and said protocol to establish a connection to said data store, and wherein said communicating comprises reading said data from said data store;

receiving a response from said data store via said interface;

receiving from said referential data store, rules for data formatting to produce a response to said request;

transforming said response from said data store in accordance with said rules, thus yielding a formatted response which includes said data; and transmitting said formatted response in a response to said request.

6. The system of claim 5, wherein said data store includes a server, and wherein said communicating comprises communicating with said server in accordance with said protocol.

7. The system of claim 5, wherein said communicating comprises forwarding to said data store, content from said request.

8. The system of claim 5, wherein said data includes a first data item and a second data item, wherein said data store is a first data store that stores said first data item, said identifier is a first identifier, and said protocol is a first protocol, wherein said obtaining further comprises obtaining, from said referential store, (a) a second identifier of a second data store that stores said second data item, wherein said second data store is one of said plurality of data stores, and (b) a second protocol to access said second data store, and wherein said communicating comprises communicating with said first data store to access said first data item, and further communicating with said second data store, through said interface, to access said second data item, wherein said interface utilizes said second identifier and said second protocol to establish a connection to said second data store.

9. A non-transitory storage medium comprising instructions that are readable by a processor to cause said processor to perform actions of:

receiving a request for access to data, wherein said request does not identify a data store that stores said data and wherein said request is a read request;

obtaining from a referential store (a) an identifier of said data store that stores said data, wherein said data store is one of a plurality of data stores, and (b) a protocol to access said data store;

communicating with said data store through an interface, by way of an electronic communication, to access said data, wherein said interface is communicatively coupled to said plurality of data stores and utilizes said identifier and said protocol to establish a connection to said data store, and wherein said communicating comprises reading said data from said data store;

receiving a response from said data store via said interface;

receiving from said referential data store, rules for data formatting to produce a response to said request;

transforming said response from said data store in accordance with said rules, thus yielding a formatted response which includes said data; and transmitting said formatted response in a response to said request.

10. The non-transitory storage medium of claim 9, wherein said data store includes a server, and wherein said communicating comprises communicating with said server in accordance with said protocol.

11. The non-transitory storage medium of claim 9, wherein said communicating comprises forwarding to said data store, content from said request.

12. The non-transitory storage medium of claim 9, wherein said data includes a first data item and a second data item, wherein said data store is a first data store that stores said first data item, said identifier is a first identifier, and said protocol is a first protocol, wherein said obtaining further comprises obtaining, from said referential store, (a) a second identifier of a second data store that stores said second data item, wherein said second data store is one of said plurality of data stores, and (b) a second protocol to access said second data store, and wherein said communicating comprises communicating with said first data store to access said first data item, and further comprises communicating with said second data store, through said interface, to access said second data item, wherein said interface utilizes said second identifier and said second protocol to establish a connection to said second data store.

13. A system comprising:

a plurality of applications;

a plurality of services communicatively coupled to said plurality of applications; and a plurality of data stores, wherein said data stores are in communication with said services via an inventory data access layer that includes a processor and a memory that contains instructions that are readable by said processor so that said processor:

receives, from a service in said plurality of service, a request for access to data, wherein said request does not identify a data store that stores said data;

obtains from a referential store (a) an identifier of said data store that stores said data, wherein said data store is one of said plurality of data stores and wherein the request is a read request, and (b) a protocol to access said data store;

communicates with said data store through an interface, by way of an electronic communication, to access said data, wherein said interface is communicatively coupled to said plurality of data stores and utilizes said identifier and said protocol to establish a connection to said data store, and wherein said communicating comprises reading said data from said data store;

receives a response from said data store via said interface;

receives from said referential data store, rules for data formatting to produce a response to said request;

transforms said response from said data store in accordance with said rules, thus yielding a formatted response which includes said data; and transmits said formatted response to said service in a response to said request, wherein a change to data in any of said data stores does not require a corresponding change to any of said services or said applications.

\* \* \* \* \*